Patented Aug. 17, 1937

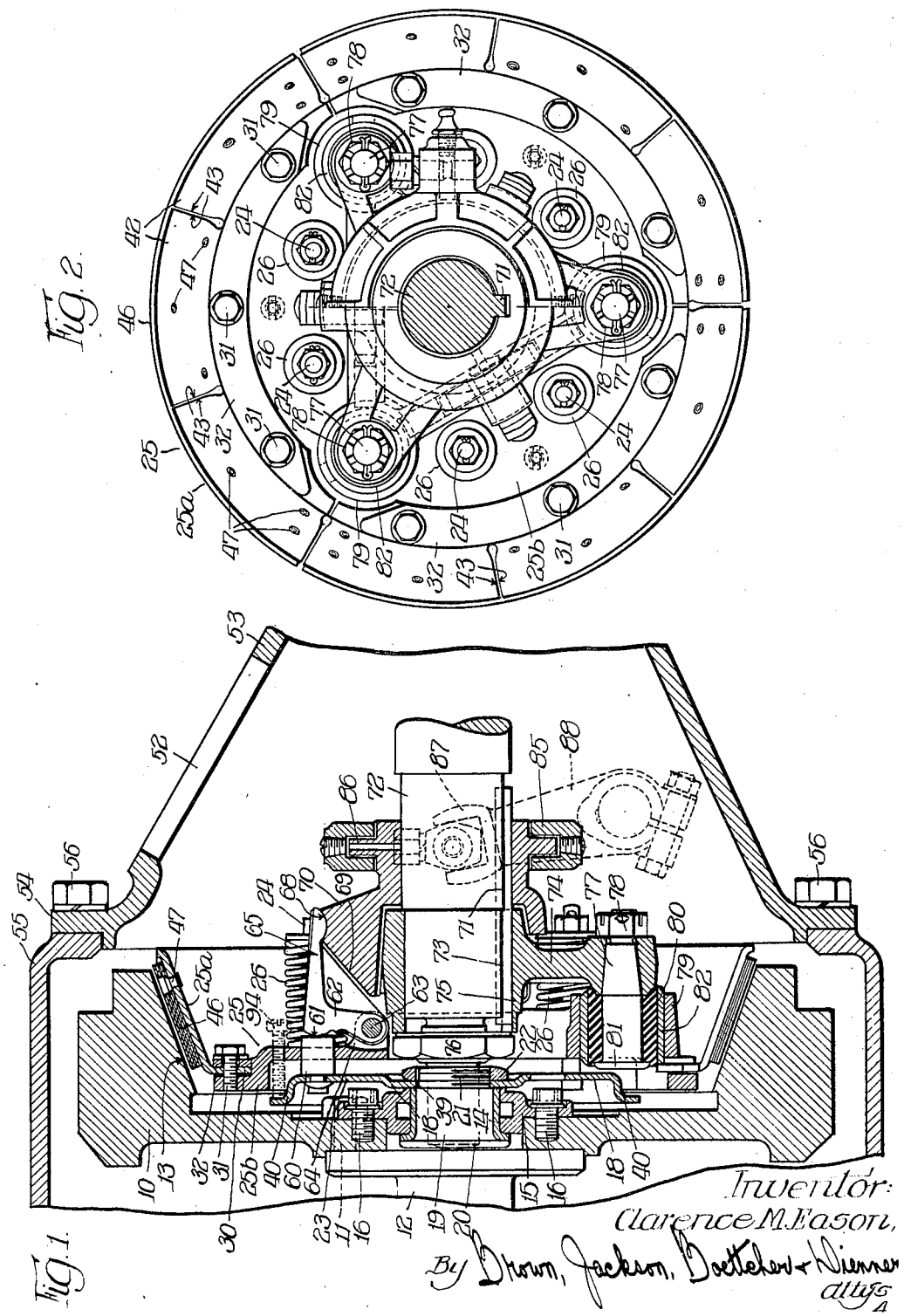

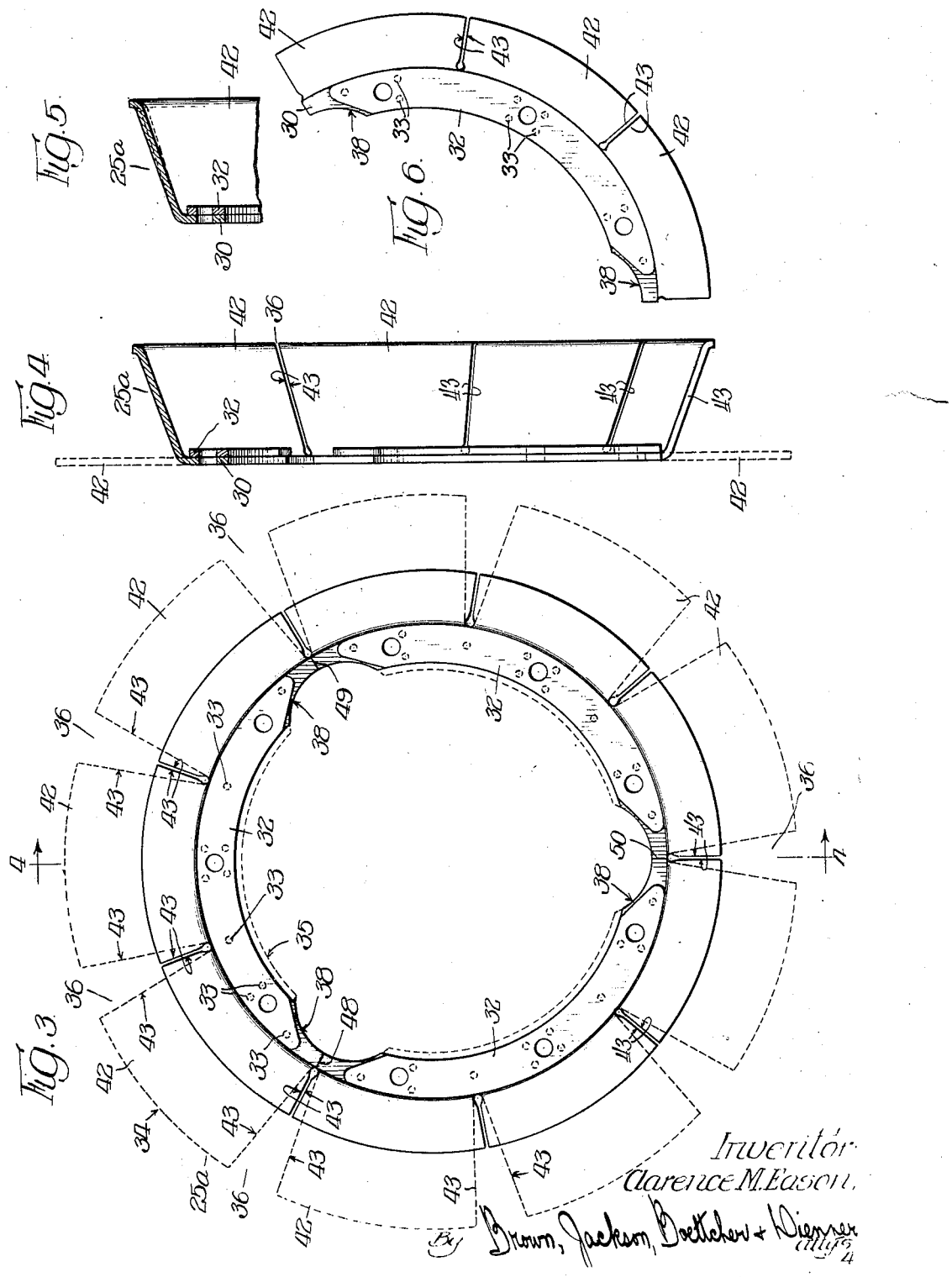

2,090,411

UNITED STATES PATENT OFFICE 2,090,411

CLUTCH

Clarence M. Eason, Waukesha, Wis., assignor to Industrial Clutch Company, Waukesha, Wis., a corporation of Wisconsin Application May 27, 1935, Serial No. 23,558

8 Claims. (Cl. 192—66)

The present invention relates to clutches and the like for connecting and disconnecting driving and driven parts, and more particularly to an improved clutch adapted for use in motor cars, trucks, busses, and in various types of industrial and agricultural machinery, and elsewhere as suitable or desired.

The present invention relates especially to cone clutches, and it is the general object of the invention to provide a novel and improved form of cone clutch member.

Heretofore in the art, these cone clutch members have been made in one piece. Removal of these one-piece members, as for the purpose of refacing the same with friction material, has required dismantling the entire clutch. For example, it has been necessary to take the driven shaft, spider, and other parts, away from the engine and main driving clutch part, and to separate the clutch housing from the flywheel housing in order to remove the cone clutch part to reface or reline the same. Accordingly, refacing of the cone clutch members of the prior art with friction material has been troublesome and expensive.

It is common practice in the art of clutch-making to bulge the cone clutch member as, for example, by placing a spring under the clutch facing to give an initial grip before the clutch is completely engaged in order to give a softer and smoother acting clutch and to remove the tendency for the clutch to grab and chatter.

The present invention provides a cone clutch member having a conical rim part adapted to be removed from position between the driving clutch part and the driven shaft, refaced and reinstalled without taking the driven shaft, spider, or other parts away from the engine and main driving clutch part, as well as without separating the clutch housing from the flywheel housing, or otherwise dismantling the clutch.

In its more limited aspects, the present invention provides a cone clutch member comprising an inner part and a cone rim part divided into a plurality of segments removably secured to the inner part and adapted to be separately removed and installed through the hand-hole of the clutch housing. This aspect of the invention and the broader aspect set forth in the preceding paragraph reduce the expense and trouble in refacing the cone clutch member.

Another feature resides in the provision of a cone clutch part having an angle normally slightly greater than the angle of the cooperating female clutch surface and adapted, with comparatively little force, to be sprung or collapsed into full engagement with the female clutch surface. This gives an initial grip along the enlarged part of the cone clutch member and, as a result, a softer and smoother acting clutch is provided, and the tendency for the clutch to grab or chatter is eliminated.

Another feature resides in forming the abutment plate for the clutch of the stock removed from the central portion of the cone rim part of the clutch.

Further features of the present invention, and the details and advantages of the illustrated embodiment of the invention will be apparent from the following detailed description, taken in connection with the accompanying drawings, in which:

Figure 1 is a vertical longitudinal sectional view of a clutch embodying the present invention;

Figure 2 is a rear elevational view of the clutch shown in Figure 1, with the driven shaft in section and the flywheel and clutch housings omitted;

Figure 3 is a rear elevational view of the cone rim part showing, in dotted lines, the manner of forming the same from flat stock without drawing operations;

Figure 4 is a vertical section, taken on the line 4—4 of Figure 3;

Figure 5 is a fragmentary detail section of the cone rim part, showing how the same springs in or collapses in engagement of the clutch and springs out or expands to an angle slightly greater than the angle of the female clutch surface when the clutch is disengaged; and Figure 6 is a rear elevational view of one of the segments into which the cone rim part is divided.

In the particular embodiment of the invention selected for illustration, the flywheel, indicated at 10, is bolted in the usual manner, as by bolts 11, to the crank shaft 12 which constitutes the driving part. The flywheel or driving clutch part 10 has a female clutch surface 13 of conical form, and disposed centrally in the flywheel 10 is a pilot bushing 14 held in position by a retaining ring 15. The ring 15 is secured to the flywheel 10 by means of bolts 16.

A clutch abutment plate 18 is secured in position centrally of the flywheel 10 by means of a central hub part 19 mounted within the bushing 14. At its forward end, the hub part 19 has a flange 20 engaged with the end of the bushing 14, and the opposite end of the hub part 19 is reduced and has threaded engagement at 21 with a nut 22 which clamps the plate 18 firmly to the hub 19 and rotates therewith relative to the flywheel in the central portion thereof within the collar bushing 14. The radially extending annular portion 23 of the plate 18 has a plurality of circumferentially spaced openings which receive bolt members 24. These bolt members 24 are supported by the plate 18 and extend through openings in the cone clutch driven member 25 and serve as supports for a plurality of loading springs 26, which springs yieldingly engage the clutch and are preferably distributed at circumferentially spaced positions about the member 25.

The cone clutch driven member 25 is divided into an outer cone part 25a and an inner part 25b. The outer margin of the inner part 25b is offset forwardly (Figure 1), and the forward end of the cone rim part 25a has an inturned radial flange 30 secured by means of bolts 31 to the outer margin of the inner part 25b. Segmental reenforcing pieces 32 are preferably spot-welded at 33 (Figure 6) to the flange 30 of the cone rim part to lie between this flange and the heads of the bolts 31, and washers may be employed as and where desired.

The cone rim part 25a is preferably made from sheet steel of the desired gauge, or other suitable flat stock. The flat sheet is stamped or otherwise cut to the annular form shown in Figures 3 and 4, the outer periphery being shaped to the configuration indicated at 34, and the central portion of the sheet being removed along the inner periphery 35 of the annular member thus formed. The flat annular member is notched or divided at circumferentially spaced positions along its outer periphery, as shown at 36. These notches or divisions 36 are of generally V-shaped form, with their wide ends at the outer periphery 34 of the flat annular member, and their inner ends spaced outwardly from the inner periphery 35 a radial distance approximately equal to the radial dimension of the flange 30. The inner periphery 35 is scalloped at three positions equi-spaced circumferentially, as shown at 38, for a purpose which will hereinafter appear. The blank cut or punched centrally from the flat annular member is preferably provided with a central opening 39 (Figure 1) to fit the reduced threaded end of the hub part 19 and forms the clutch abutment plate 18. The outer margin of this plate 18 is offset forwardly at 40.

The annular blank, with its outer margin slotted or divided, and which is to constitute the cone rim part, is then placed between a pair of conical die members (not shown) and pressed to form the conical rim part with the flange 30 as shown in Figure 4. The die means, instead of drawing a conical rim from flat stock, which is a difficult manufacturing operation requiring large and expensive presses, merely folds or forms the freed portions 42 between the notches or divisions 36 in from the plane of the flange part 30 to the desired conical form as shown. The edges 43 of the segment-like portions 42 preferably abut when the rim is collapsed or contracted as shown in dotted lines in Figure 5, whereby the cone rim is in the form of a continuous arch structure, with each segment-like portion 42 acting as a keystone or arch in said structure. As a result, this arched structure of the cone rim has just as much strength as a solid cone rim.

By avoiding the difficult drawing operations for drawing a cone rim from flat stock and employing merely a folding and forming operation to bring the segment-like portions 42 to the desired conical form, the cost and difficulty of forming the cone rim are greatly reduced. The drawing operations heretofore employed, in addition to being difficult, required large and costly presses, whereas the folding and forming operation which I employ can be done on a small inexpensive press. And the use of the central portion of the flat stock, which is stamped or otherwise removed from within the inner periphery 35 of the annular cone rim forming member as the abutment plate 18, further reduces the cost.

In addition, due to the inherent springiness of the stock which is preferably employed, the conically arranged segments 42 have a tendency to spring open slightly. This gives the conical rim of the cone member 25 a slightly greater angle than the cooperating female cone surface 13 of the flywheel or driving clutch part 10, as shown in full lines in Figure 5. As a result, when the clutch is engaged, the cone rim bears first on its outer enlarged portion and, with comparatively little force, is collapsed to proper angularity as shown in dotted lines in Figure 5 for full engagement with the clutch surface 13. This gives a softer acting clutch which engages more smoothly and in which the tendency of the clutch to grab, stutter or chatter during engagement is eliminated.

This flow or springing action of the cone rim part in the operation of the clutch is an important aspect of the present invention. The advantages above set forth are obtained without placing a spring under the clutch facing or lining to give an initial grab and make the clutch smoother acting as commonly resorted to heretofore in the art. When the cone rim member 25a is in full engagement with the clutch surface 13, the edges 43 of the segment-like portions 42 are preferably in abutting engagement and present a solid cone rim of great strength, as already described.

Upon bringing the cone rim part 25a into the desired conical form in the manufacture of this part, it is completed, turned, machined, or otherwise finished, and the lining or facing 46 is applied thereto while the part 25a is in one piece. The lining or facing 46 may be the usual or any suitable or preferred friction facing or lining material riveted at 47 or otherwise secured to the conical rim of the cone part 25a. The completion and finishing the cone part 25a with its friction facing 46, while this part 25a is in one piece, enables bringing this part to true and accurate form.

After the part 25a has been completed and finished and the friction facing 46 has been applied thereto, this part, with its facing 46, is then divided at 48, 49 and 50 into three or any other desired number of equal length segments. The divisions 48, 49 and 50 are preferably equi-spaced circumferentially so that the cone segments will be interchangeable, but this may vary within the scope of the present invention. The cone segments are secured to the inner part 25b by the bolts 31, and the sectionalized cone clutch driven member 25, comprising the cone rim section constituting the outer cone part 25a and the inner part 25b, is ready for use.

The three segments constituting the cone rim part 25a are of convenient size to be easily removed through the hand-hole 52 of the clutch housing 53. The housing 53 has a flange 54 at its foward end, which flange laps a flange on the rear end of the flywheel housing 55 and is removably secured thereto as by means of bolts 56. By unbolting the cone segments forming the cone rim 25a from the inner part 25b, these segments may be separately removed through the hand-hole 52, refaced with friction facing material 46, returned through the hand-hole 52, and reapplied to the inner part 25b without taking the driven shaft, spider, or other parts away from the driving clutch part as heretofore necessary where the cone clutch part was made up in one piece. And removal and refacing of the cone segments is permitted without separating the clutch housing 53 from the flywheel housing 55, or otherwise dismantling the clutch.

Referring to the remaining details of the clutch, the plate 18 has riveted or otherwise secured thereto posts or studs 60 which extend through openings in the inner clutch part 25b and serve as keys for causing the abutment plate member 18 and the driven clutch member 25 to rotate together. The outer ends of these posts 60 constitute abutments for the rounded engaging portions 61 of bell crank levers 62. These levers 62 are pivoted at 63 upon lugs 64 integral with the adjacent side of the inner portion of the inner clutch part 25b. The bell crank levers 62 are rotatable about the pivots 63 and react against the outer ends of the studs 60 to draw the cone clutch member 25, as a unit, outwardly of the flywheel 10 for disengaging the friction facing 46 of the cone clutch member from the clutch surface 13. The drawing or clutch disengaging action is applied at the pivots 63 through the leverage of the arms 65 of the bell crank levers 62, and the leverage between the pivots 63 and the engagement of the rounded portions 61 of the bell crank levers with the adjacent ends of the abutment posts 60 to disengage the clutch against the action of the loading springs 26. The outer ends of the arms 65 are formed at 68 for camming engagement with the camming surface 69 of an actuating member 70 splined as at 71 to the driven shaft 72.

Splined at 73 upon the inner or forward end of the shaft 72 is a spider member 74 having a hub portion 75 secured against endwise movement with respect to the shaft 72 by means of a lock nut 76. The spider 74 is provided with a plurality of extending arms, as shown in Figures 1 and 2, which carry the studs 77 for drivingly connecting the spider 74 with the cone clutch driven member 25. The studs 77 have tapered fit in tapered openings in the arms of the spider 74 (Figure 1), and are secured to these arms as by means of lock nuts 78.

The opposite ends of the studs 77 extend into the openings in the tubular bosses 79 formed integral with the inner cone clutch part 25b. Deformable resilient bushings 80 of rubber or other suitable material are disposed in the openings in the bosses 79 for transmitting the torque from the driven clutch part 25 to the driven shaft 72. The outer ends of the studs 77 are headed or flanged at 81 to hold the bushings 80 in place on the studs and between the headed ends of the studs and the arms of the spider 74. The bushings 80 are enclosed in metal sleeves 82, which metal sleeves are carried by the bushings 80, which bushings are extended or pressed into firm engagement with the inner surfaces of the sleeves 82. These sleeves 82 slidably or shiftably receive the bosses 79 of the cone clutch part 25b, so that upon shifting the cone clutch part 25b, this part will shift freely with respect to the sleeves 82 and the resilient bushings 80 carrying these sleeves.

The rubber or resilient bushings 80 permit coaxial misalignment of the driving and driven shafts which is difficult to avoid because of practical limitations, and it permits this misalignment without destructive effects, such as the imposition of stresses on the shafts or the clutch resulting in localized wear and rapid eventual destruction of these members as encountered prior to the invention disclosed in my copending application, Serial No. 731,614, filed June 21, 1934. And, at the same time, the bosses 79 on the driven clutch member 25 are shiftable bodily upon the sleeves 82 of the resilient bushings 80. The resilient bushings permit misalignment, and the bodily shifting movement of bosses 79 on the sleeves 82 permits free shifting movement of the driven clutch member 25. The sleeves 82 have metal-to-metal sliding engagement within the sockets in the bosses 79 for the axial movement which takes place, and immediately upon application of any angular torque upon the bushings the clutch member 25 becomes stationary with respect to the bushings and further stresses are taken within the body portions of the bushings.

Thus, during normal endwise movement of the driven clutch member 25 for the purpose of disengaging or adjusting the same, the bosses 79 slide over the sleeves 82, but upon the imposition of torque during rotation of the cone member 25 with the flywheel 10, and as a result of any slight misalignment which is inevitable with installations of this sort, the drive is transmitted through the plastic or yieldable bushings 80, the body portions of which bushings accommodate or take up any stresses due to the uneven torque produced by such misalignment. Thus the engaging surfaces of the clutch are not displaced relative to each other and a uniform contact between these surfaces is maintained at all times and in spite of misalignment between the driving a .d driven shafts. Due to the fact that any sliding engagement of the driven cone member 25 axially with respect to the driven shaft 72 is taken up by the sliding of the member 25 on the sleeves 82, and due to the fact that when the clutch is engaged the pilot bearing takes up any load, there is never at any time any end thrust upon the driving or driven members whether the clutch is engaged or disengaged.

The member 70 is slidable axially of the shaft 72 upon the spline 71 and is actuated by means of the clutch yoke collar 85 mounted upon the annular flange 86 of the hub portion of the actuating member 70. The yoke collar 85 is adapted to be engaged by the inner end 87 of the clutch operating lever 88 for throwing the clutch into and out of engagement. When the member 70 is moved outwardly axially along the shaft 72 to the right, as viewed in Figure 1, the cam ends 68 of the arms 65 ride down the surface 69, and the springs 26 force the driven cone clutch member into clutching engagement with the clutch surface 13 of the flywheel 10.

When the clutch actuating member 70 is moved inwardly to the left, as viewed in Figure 1, into the position shown, the camming surface 69 engages the cam ends 68 of the arms 65. This swings the bell crank levers 62 about their respective pivots 63, and by the engagement of the rounded portions 61 with the abutment posts 60, the driven cone member 25 is drawn out of engagement with the flywheel through the pivotal connections 63 between the levers 62 and the member 25.

Screws 94 are threaded through the cone part 25b and into engagement at their inner ends with the abutment plate to hold the parts in proper correlation during shipment. When the clutch is applied for use, these screws are removed.

The scallops 38 in the inner periphery 35 of the cone segments forming the cone rim member 25a give clearance around the bosses 79. And these scallops 38 are also adapted to be engaged by a three corner clamp for holding the cone rim member in drilling the holes for the bolts 31 and performing any other desired operations upon said member before dividing the same at 48, 49 and 50.

I do not intend to be limited to the particular use of the invention or to the precise details shown and described.

I claim:

1. A cone clutch member comprising an inner cone clutch part, a cone rim part divided into a plurality of arcuate cone rim segments, each having a cone rim portion with a radial flange at one end of the same, and means cooperating with the radial flanges of said cone rim segments for removably securing said segments to the outer margin of said inner cone clutch part, said cone rim segments being resilient and adapted to abut edgewise by engagement of said cone clutch member with a cooperating clutch member.

2. In combination, a first clutch member having an inner conical clutch surface, a cone clutch member comprising an inner cone clutch part, a cone rim having a cone rim part cooperable with the inner conical clutch surface of said first clutch member and having a radial flange at one end of the same, and means cooperating with the radial flange of said cone rim for removably securing said cone rim to said inner cone clutch part, said cone rim being divided longitudinally of the clutch to form divided cone rim portions, said divided cone rim portions being of resilient character with said cone rim portions normally disposed at a slightly greater angle than the inner conical clutch surface of said first clutch member and adapted to abut edgewise upon engagement of said divided cone rim portion with the inner conical clutch surface of said first clutch member, whereby to present great strength in said cone rim at such time.

3. In combination, a cone clutch member formed of a flat plate with the central portion removed and having circumferentially spaced V-shaped notches opening from the outer periphery of the plate and extending inwardly to positions spaced radially outwardly from the inner periphery of the plate, the portions of said plate between said notches being of resilient character and disposed obliquely with respect to the inner portion of the plate to form a conical rim with the portion of the plate inwardly of said notches forming a radial flange at the inner end of said conical rim, and a rigid inner cone clutch part secured to said radial flange adjacent the small diameter end of said conical clutch rim.

4. In combination, a cone clutch member formed of a flat plate with the central portion removed and having circumferentially spaced V-shaped notches opening from the outer periphery of the plate and extending inwardly to positions spaced radially outwardly from the inner periphery of the plate, said cone clutch member being divided radially into a plurality of arcuate segments and the portions of said plate between said notches being of resilient character and disposed obliquely with respect to the inner portion of the plate to form a conical rim with the portion of the plate inwardly of said notches forming a radial flange at the inner end of said conical rim, and a rigid inner cone clutch part secured to said radial flange adjacent the small diameter end of said conical clutch rim.

5. In combination, a cone clutch member formed of a resilient plate split radially at circumferentially spaced locations by cuts extending to the periphery of the plate, the portions of said plate between said cuts being of resilient character and disposed obliquely to form a conical rim with the portion of said plate inwardly of said cuts forming a radial flange at the inner end of said conical rim, and a rigid inner cone clutch part removably secured to said radial flange adjacent the small diameter end of said conical rim.

6. In combination, a driving clutch member having a female clutch surface of conical form, a cooperating cone clutch driven member comprising an inner clutch part and a cone rim part, said cone rim part being faced with friction material and the rim part and friction facing being divided into a plurality of cone rim segments separately secured to said inner clutch part, the rim portion of each of said segments being notched at circumferentially spaced locations to form arcuate rim portions, the edges of said arcuate rim portions being adapted to abut to form an arched structure of relatively great strength when the cone clutch driven member is in engagement with the driving clutch member and said arcuate rim portions having springiness to spread open to an angularity slightly greater than the angularity of the female clutch surface of said driving clutch member when said cone clutch driven member is disengaged from said driving clutch member.

7. In combination, a cone clutch member divided radially into a plurality of arcuate segments and formed of a flat plate with each of said arcuate segments split at circumferentially spaced locations by cuts extending to the peripheries of said segments, the portions of each of said segments between said cuts being of resilient character and disposed obliquely to form conical rim portions constituting a conical rim, with the portions of said segments inwardly of said cuts forming radial flange portions at the inner ends of said conical rim portions, and a rigid inner cone clutch part secured to said radial flange portions adjacent the small diameter end of said conical rim.

8. A cone clutch member comprising a sheet metal male cone clutch rim part divided by generally longitudinally directed slits at circumferentially spaced locations into a plurality of cone rim portions of arcuate form, the edges of said slits adapted to abut in a circumferential direction when the clutch is engaged, to form of the sheet metal part an arched structure of relatively great strength, and said portions having springiness to spring open when the clutch is disengaged to an angularity slightly greater than the angularity of said cone rim part when the clutch is engaged and the edges of said portions are in abutting engagement.

CLARENCE M. EASON.